United States Patent Office 3,065,271
Patented Nov. 20, 1962

3,065,271
PHOSPHINOBORINE COMPOUNDS AND
THEIR PREPARATION
Anton B. Burg, Los Angeles, and Ross I. Wagner, Montebello, Calif., assignors, by mesne assignments, to American Potash & Chemical Corporation, a corporation of Delaware
No Drawing. Filed Aug. 27, 1957, Ser. No. 680,625
16 Claims. (Cl. 260—606.5)

This application, which is a continuation-in-part of our copending application, Serial No. 446,147, filed July 27, 1954, and now abandoned relates in general to phosphinoborines and their production. A divisional application of the aforementioned Serial No. 446,147, which is identified as application Serial No. 754,914, filed August 14, 1958, describes and claims compounds similar to those claimed herein. More particularly, this invention relates to phosphinoborines which are copolymers of a type which may be termed "Fused Ring" copolymers.

The materials ordinarily used in the preparation of copolymers and plastic materials are organic in nature and may display unsatisfactory chemical and thermal stability under conditions of specialized usage.

It is therefore an object of this invention to provide a group of basically inorganic polymers having unusual chemical and thermal stability.

A further object of this invention is to provide a method for synthesizing phosphinoborine polymers.

Ancillary objects and advantages of this invention, if not specifically set out, will become apparent during the course of the detailed description which follows.

Broadly, it has been found that polymeric rings of phosphinoborines which are unusually stable may be prepared from mixtures of phosphine borine addition compounds. They have the general formula $$(RR'PBH_2)_n(R''PBH)_m$$

wherein R, R' and R'' designate any alkyl or aryl group, which may be the same or different. The letter $n$ is an integer indicative of the number of phosphinoborine units of the type $(RR'PBH_2)$ present in the fused ring polymer formed and $m$ is an integer indicative of the number of $(R''PBH)$ units present. Where the individual polymeric species cannot be conveniently isolated the composition of the copolymer is most conveniently expressed as a ratio, $n/m$. The composition of species isolable in high purity may also be expressed by this simple ratio. These products have unusual stability and may be prepared by pyrolyzing a mixture of a secondary phosphine borine of the type $RR'HP:BH_3$ together with a primary phosphine borine of the type $R''H_2P:BH_3$, each of the symbols being used here as given earlier in the general formula. The most elementary of the products of this invention are fused hexatomic rings or fused octatomic rings of the type shown below:

(I)
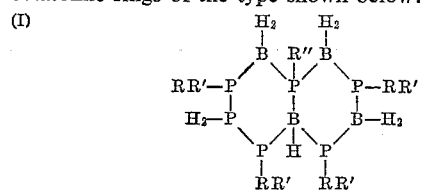

or:
(II)
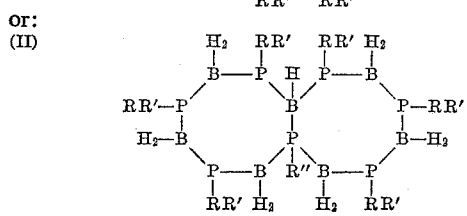

or:

(III)
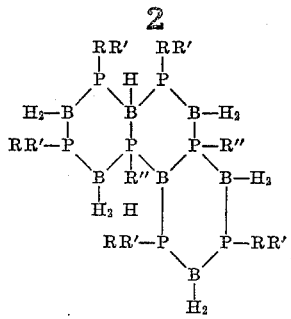

The ratio of starting materials, S/P, where S represents secondary phosphine borine of the type $RR'HP:BH_3$ and P represents primary phosphine borine of the type $R''H_2P:BH_3$, has a marked influence on the molecular weight distribution of the final polymeric products. With high values of S/P the average molecular weight of the polymeric products is low and relatively large amounts of compound I are formed. Low values of S/P produce highly polymeric products from which only small amounts of the simple copolymers such as I and III may be isolated. With every value of S/P a by-product mixture of the trimer and tetramer of secondary phosphinoborine units is formed, the amount varying from large at high values of S/P to minute traces as S/P approaches zero. In these copolymers a fraction of the total number of the individual rings is octatomic just as in the case of the cyclic polymers of secondary phosphinoborines where the ratio of hexatomic to octatomic rings is approximately thirteen. Inspection of the formulae for compounds I, II and III reveal that the ratio $n/m$ has the values 4:1, 6:1, and 2.5:1, respectively, for these simple copolymers. Where the ratio of $[RR'PBH_2]$ units to $[R''PBH]$ units approaches 1:1, progressively greater numbers of the $[R''PBH]$ units are incorporated within the ring structure, thus providing means for the bonding of additional $(RR'PBH_2)$ units and, in the fashion, increasing the size of the molecule.

The preferred ratio of $(RR'PBH_2)$ to $(R''PBH)$ thus falls within the range 6:1–1:1 though small quantities of the fused ring substances will still be produced even at extreme ratios—e.g. 60:1 has been successfully tried. The 6:1 ratio encourages the formation of the octatomic rings which, in any event, form in far less number than the hexatomic rings and in admixture therewith. The 1:1 ratio encourages the formation of a polymer having present equal quantities of the two ingredients—and a consequent extremely large molecular size. As the ratio decreases below 1:1, the copolymers obtained exhibit increasing thermal stability but also increasing brittleness.

More particularly, the preparation of the condensed ring type phosphinoborine polymers may be accomplished through the pyrolysis of a mixture of a primary phosphine borine addition compound such as a phosphine borine of the type methylphosphine borine, $$(CH_3)H_2PBH_3$$

and a secondary phosphine borine such as dimethylphosphine borine, $(CH_3)_2HPBH_3$. Preferably, the second reactant is present relative to the first in a ratio approaching zero as the copolymer molecular weight becomes increasingly large. This encourages the formation of condensed ring polymers of greater size. Ratios such as 4:1 encourage the formation of the simple dual hexatomic ring polymer set out above. Specifically, the hexatomic condensed ring polymers have a general formula $$(RR'PBH_2)_{x+2}(R''PBH)_{x-1}$$

where $x$ is the number of fused hexatomic rings. Thus, the simplest of the materials, that wherein two rings are fused together becomes $(RR'PBH_2)_4(R''PBH)$. The octatomic rings have the general formula $$(RR'PBH_2)_{2y+2}(R''PBH)_{y-1}$$

where $y$ is the number of octatomic rings. Thus, the most elementary of the octatomic materials becomes $(RR'PBH_2)_6(R'PBH)$. It is to be borne in mind that, in any event, small quantities only of these octatomic rings are formed in comparison with the quantity of hexatomic ring polymers. It is not possible to prepare them to the exclusion of the hexatomic materials, and when both hexatomic and octatomic rings are incorporated in the copolymer species the general formula becomes $(RR'PBH_2)_{x+2y+2}(R'PBH)_{x+y-1}$. Thus the simplest species of this type becomes $(RR'PBH_2)_5(R''PBH)$ with the structural formula:

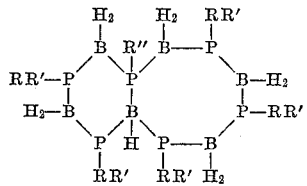

It is to be noted that in the description of the preparation method above no mention was made of pyrolyzing materials of the type $RR'HP:BH(CH_3)_2$, $$RR'HP:BH_2CH_3$$

or $R''H_2R:BH_2CH_3$. This is because of the fact that at the temperatures at which the pyrolysis takes place, disproportionation of a phosphine methylborine occurs before appreciable loss of hydrogen from the P and B atoms. Thus, various by-products are produced including various phosphine trimethylborines which cannot be caused to lose hydrogen from the boron—there being no further hydrogen groups left. However, even when such generally unacceptable precursors as these are used, the fused ring polymers of this invention may be prepared in small yield. The compound $RR'HP:BHR''R'''$ for example, on disproportionation produces $RR'HP:BH_2R'''$ and $RR'HP:BR''_3$. The former will be further disproportionated but will also lose hydrogen to form a phosphinoborine monomer which may then be incorporated in a fused ring polymer. A compound of the type $$RH_2P:BH_2R'$$

will disproportionate in the same fashion to yield $$RH_2P:BH_3$$

and $RH_2P:BHR'_2$, the first of which, in turn will be hydrogen, to supply the $(RPBH)$ units necessary for the formation of the fused ring polymers.

It is seen from the above that the primary phosphine borine has lost a hydrogen from both the phosphorus and the boron while the secondary phosphine borine has done likewise, the primary phosphine borine forming to the innermost link in the phosphinoborine unit. That is, the primary phosphine borine, having two hydrogens on each of the phosphorus and boron atoms which can be readily split off, loses these two hydrogens to free a pair of valence bonds which can in turn be joined to the adjacent boron or phosphorus of the secondary phosphine borine which has lost only one hydrogen from each of the phosphorus and boron atoms.

The pyrolysis is carried out under reflux in the absence of a solvent or in a refluxing solvent of high boiling point such as n-butyl ether or triethylene glycol dimethyl ether. The preferred method of pyrolyzing phosphine borines does not necessitate the use of a solvent, however. Refluxing a phosphine borine itself in the absence of a solvent but in an inert atmosphere is an extremely simple way to remove the hydrogen. No product contamination with the solvent is observed where this method is used, and the reflux time is decreased considerably from that required where a solvent is employed. It is advantageous to pass the $H_2$ evolved by the reaction into a mercury bubbler—this affording a ready method of ascertaining when the reaction has gone to completion.

The practice of this invention both with respect to performing the processes and securing the products thereof will become apparent from the following examples which are set forth by way of illustration.

*Example I.*—Dimethylphosphine borine, $$(CH_3)_2HP:BH_3$$

in the amount of 15.2 g. and methyl phosphine borine, $CH_3H_2P:BH_3$, in the amount of 1.85 g. were placed in a ratio of 6.69:1 in a previously evacuated two liter long-necked flask. The flask was heated at 200 C. for a period of 12 hours and the hydrogen evolved conveyed into a mercury bubbler. After removal of the by-products, dimethylphosphinoborine trimer and tetramer, the product, $[(CH_3)_2PBH_2]_n[CH_3PBH]_m$, had the empirical composition expressed by the ratio $n/m=2.31$. Fractionation of the product yielded a crystalline solid sublimate, $$[(CH_3)_2PBH_2]_4[CH_3PBH]$$

M.P. 98–99° C., mol. wt. 347 (calc. 353.36), a glassy distillate, $[(CH_3)_2PBH_2]_5[CH_3PBH]_2$, mol. wt. 475 (calc. 485.08), and a glassy residue composed of copolymers with a lower ratio of $n/m$ and correspondingly higher molecular weights.

Additional runs were made wherein the ratio of ingredients was varied. The results are set out in tabular form below:

| Ex. | $(CH_3)_2HP:BH_3$ mmoles | $CH_3H_2P:BH_3$ mmoles | $\dfrac{(CH_3)_2HP:BH_3}{CH_3H_2P:BH_3}=\dfrac{S}{P}$ | $\dfrac{(CH_3)_2PBH_2}{CH_3PBH}=\dfrac{n}{m}$ |
|---|---|---|---|---|
| II | 2.64 | 2.65 | 0.996 | 0.895 |
| III | 174.2 | 43.3 | 4.02 | 1.80 |
| IV | 4.79 | 0.955 | 5.01 | 1.86 |
| V | 39.49 | 5.28 | 7.48 | 2.52 |
| VI | 4.58 | 0.455 | 10.0 | 2.96 |

*Example VII.*—The following materials were distilled into a 200 ml. bulb equipped with a seal-off tip: 199.3 cc. $CH_3(C_2H_5)PH$, 49.8 cc. $CH_3PH_2$ and 128.2 cc. $B_2H_6$. The bulb was allowed to warm up to form the addition compounds, which were degassed at −78° C. before the bulb was sealed under vacuum. The mole ratio of $CH_3(C_2H_5)P:BH_3$ to $CH_3H_2P:BH_3$ was 4:1. The bulb was then placed in an oven at 185° C. for 75 hours, at which time the hydrogen was removed, measured and found to be 294.1 cc. (98.4 percent theoretical). The product was a clear, fairly viscous liquid. Separation of the product into four liquid fractions plus a residue was accomplished by vacuum distillation without reflux. A time-temperature record was kept of the distillation and is shown in Table I below:

Table I $[CH_3(C_2H_5)PBH_2]_n$—$(CH_3PBH)_m$ copolymer

| Fraction | T., °C. | Time, hrs. | Weight, g. | Weight percent of reaction mixture |
|---|---|---|---|---|
| 1 | 80 | 3 | 0.3569 | 39.0 |
| 2 | 110 | 16 | 0.0259 | 2.84 |
| 3 | 140 | 3 | 0.0817 | 8.95 |
| 4 | 140 | 3.5 | | |
| | 150 | 16.5 | 0.1295 | 14.2 |
| 5 | Residue | | 0.3206 | [1] 35.1 |

[1] By difference.

The first fraction was mostly $[CH_3(C_2H_5)PBH_2]_3$; the second, third and fourth were liquids of increasing viscosity. The residue was a colorless glassy copolymer. The fourth fraction was composed primarily of $$[CH_3(C_2H_5)PBH_2]_4[CH_3PBH]$$

copolymer and the residue was composed of copolymers of higher molecular weight.

*Example VIII.*—In a second and larger experiment, 6232 cc. (21.166 g.) methylethylphosphine, 1548 cc. (3.319 g.) methylphosphine and 3890 cc. (4.810 g.) diborane were condensed into a tubular reaction vessel and the 4.03:1 mixture of $CH_3(C_2H_5)PH:BH_3$ and $CH_3PH_2:BH_3$ was refluxed for 19 hours in a nitrogen atmosphere. The resulting moderately viscous, amber colored liquid was separated into five colorless liquid fractions and a clear yellow glass residue as indicated in Table II below. The spontaneous ignition temperatures were determined on each fraction.

Table II $[CH_3(C_2H_5)PBH_2]_n$—$(CH_3PBH)_m$ copolymer

| Fraction | T., °C. | Time, hrs. | Weight, g. | Weight percent of product | Spontaneous ignition temp., °C. | Mole weight |
|---|---|---|---|---|---|---|
| 1 | 99 | 5.5 | 9.9 | 34 | 214 | 269 |
| 2 | 123 | 9.8 | 1.9 | 6.6 | 221 | 283 |
| 3 | 140 | 8 | [1] Ca. 1.8 | Ca. 6 | 221 | 356 |
| 4 | 140 | 8 | [1] Ca. 3.6 | Ca. 13 | 248 | 388 |
| 5 | 150 | 88 | [1] Ca. 3.6 | Ca. 13 | 257 | 393 |
| 6 | Residue | | 7.9 | 27 | 288 | 594 |

[1] Composite weight of fractions 3–5 by difference; individual weights estimated from relative volumes.

The first and third fractions were primarily by-product methylethylphosphinoborine trimer, $[CH_3(C_2H_5)PBH_2]_3$, and tetramer, $[CH_3(C_2H_5)PBH_2]_4$, with a mixture of these compounds in the second fraction. Fractions 4 and 5 were composed primarily of the copolymer, $$[CH_3(C_2H_5)PBH_2]_4[CH_3PBH]$$

contaminated with varying amounts $[CH_3(C_2H_5)PBH_2]_4$. The residue was a clear, colorless glass representing in the main substances of greater molecular weight than the copolymer in fractions 4 and 5.

*Example IX.*—The procedure used in the following was the same as that set forth in Example VII above, the following amounts of materials being used: 197.9 cc. $CH_3(C_2H_5)PH$, 49.5 cc. $C_2H_5PH_2$ and 127.2 cc. $B_2H_6$. The ratio of methylethylphosphine to ethylphosphine was 4:1. After pyrolysis at 185° C. for 78 hours, 284.1 cc. $H_2$ (95.7 percent theoretical) had been produced. The liquid product was fractionated as described in the earlier examples. The results on fractionation of the product were those set forth in Table III below:

Table III $[CH_3(C_2H_5)PBH_2]_n$—$(C_2H_5PBH)_m$ copolymer

| Fraction | T., °C. | Time, hrs. | Weight, g. | Weight percent of product |
|---|---|---|---|---|
| 1 | 80 | 3.5 | 0.4341 | 46.0 |
| 2 | 100 | 2 | 0.0017 | 0.18 |
| 3 | 120 | 1 | 0.0297 | 3.16 |
| 4 | 130 | 15 | 0.1022 | 10.86 |
| 5 | 150 | 9 | 0.1005 | 10.68 |
| 6 | Residue | | 0.2737 | [1] 29.1 |

[1] By difference.

The first and third fractions were primarily by-product methylethylphosphinoborine trimer $[CH_3(C_2H_5)PBH_2]_3$ and tetramer $[CH_3(C_2H_5)PBH_2]_4$ respectively with a mixture of these compounds being secured in the second fraction. Fractions four and five were composed primarily of the copolymer $[CH_3(C_2H_5)PBH_2]_4[C_2H_5PBH]$ contaminated with varying amounts of $$[CH_3(C_2H_5)PBH_2]_4$$

The residue was a clear, colorless glass representing, in the main, substances of greater molecular weight than the copolymers of fractions 4 and 5.

*Example X.*—The procedure used in the following was the same as that set forth in Example VII above, the following amounts of materials being used: 187.4 cc. $CH_3(C_2H_5)PH$, 46.7 cc. (0.2294 g.) $C_6H_5PH_2$ and 108.6 cc. $B_2H_6$. The ratio of methylethylphosphine to phenylphosphine was 4.01:1. After pyrolysis at 185° C. for 78 hours, the by-product hydrogen was removed but not measured. The liquid product was fractionated as described in the earlier examples. The results on fractionation of the product were those set forth in Table IV below:

Table IV $[CH_3(C_2H_5)PBH_2]_n$—$[C_6H_5PBH]_m$ copolymer

| Fraction | T., °C. | Time, hrs. | Weight, g. | Weight percent of product |
|---|---|---|---|---|
| 1 | 80 | 4.0 | 0.2156 | 21.9 |
| 2 | 100 | 2.5 | 0.0137 | 1.4 |
| 3 | 120 | 3.5 | 0.0694 | 7.0 |
| 4 | 130 | 15.5 | 0.0569 | 5.8 |
| 5 | 150 | 8.5 | 0.0643 | 6.5 |
| 6 | 160 | 5.0 | 0.0302 | 3.1 |
| 7 | 180 | 19.0 | 0.0194 | 11.1 |
| 8 | 200 | 23.0 | 0.0213 | 2.2 |
| 9 | 220–30 | 23.5 | 0.0200 | 2.0 |
| 10 | Residue | | [1] 0.3845 | 39.0 |

[1] By difference.

The first and fifth fractions were primarily by-product methylethylphosphinoborine trimer, $[CH_3(C_2H_5)PBH_2]_3$, and tetramer, $[CH_3(C_2H_5)PBH_2]_4$, respectively, with a mixture of these compounds being secured in the second, third and fourth fractions.

Fractions eight and nine were composed primarily of the copolymer $[CH_3(C_2H_5)PBH_2]_4[C_6H_5PBH]$ while fractions six and seven were mixtures of this copolymer with $[CH_3(C_2H_5)PBH_2]_4$. The residue was a clear amber glass, representing, in the main, substances of greater molecular weight than the copolymer of fractions eight and nine.

Stoichiometry for additional runs carried out in accordance with the process set forth in greater detail in Examples I–X is set forth in Table V below:

Table V

| Example No. | RR'HP:BH$_3$ | Grams | R''H$_2$P:BH$_3$ | Grams | Principal copolymer product |
|---|---|---|---|---|---|
| XI | (C$_6$H$_5$)$_2$HP:BH$_3$ | 11.4 | C$_2$H$_5$H$_2$P:BH$_3$ | 1.52 | [(C$_6$H$_5$)$_2$PBH$_2$]$_4$[C$_2$H$_5$PBH]. |
| XIII | (C$_6$H$_{11}$)$_2$HP:BH$_3$ | 17.0 | (n-C$_4$H$_9$)H$_2$P:BH$_3$ | 5.32 | [(C$_6$H$_{11}$)$_2$PBH$_2$]$_n$[n-C$_4$H$_9$PBH]$_m$. |
| XIV | (C$_6$H$_5$)$_2$HP:BH$_3$ | 0.290 | n-C$_3$H$_7$H$_2$P:BH$_3$ | 0.107 | [(C$_6$H$_5$)$_2$PBH$_2$]$_n$[n-C$_3$H$_7$PBH]$_m$. |
| XV | C$_6$H$_5$(CH$_3$)HP:BH$_3$ | 0.528 | CH$_3$H$_2$P:BH$_3$ | 0.124 | [C$_6$H$_5$(CH$_3$)PBH$_2$]$_n$[CH$_3$PBH]$_m$. |
| XX | (C$_8$H$_{17}$)$_2$HP:BH$_3$ | 6.36 | CH$_3$H$_2$P:BH$_3$ | 2.45 | [(C$_8$H$_{17}$)$_2$PBH$_2$]$_n$[CH$_3$PBH]$_m$. |
| XXI | n-C$_{12}$H$_{25}$(CH$_3$)HP:BH$_3$ | 19.2 | CH$_3$H$_2$P:BH$_3$ | 2.60 | [n-C$_{12}$H$_{25}$(CH$_3$)PBH$_2$]$_n$[CH$_3$PBH]$_m$. |
| XXII | 2-C$_{10}$H$_7$(CH$_3$)HP:BH$_3$ | 4.52 | CH$_3$H$_2$P:BH$_3$ | 1.49 | [2-C$_{10}$H$_7$(CH$_3$)PBH$_2$]$_n$[CH$_3$PBH]$_m$. |
| XXIV | (CH$_3$)$_2$HP:BH$_3$ | 14.2 | C$_6$H$_{11}$H$_2$P:BH$_3$ | 12.7 | [(CH$_3$)$_2$PBH$_2$]$_4$[C$_6$H$_{11}$PBH]. |
| XXV | (CH$_3$)$_2$HP:BH$_3$ | 0.142 | p-C$_6$H$_5$C$_6$H$_4$H$_2$P:BH$_3$ | 0.197 | [(CH$_3$)$_2$PBH$_2$]$_n$[p-C$_6$H$_5$C$_6$H$_4$PBH]$_m$. |

| Example No. | RR'HP | Grams | R''H$_2$P | Grams | Grams B$_2$H$_6$ | Principal copolymer product |
|---|---|---|---|---|---|---|
| XII | (C$_6$H$_5$)$_2$HP | 0.371 | CH$_3$H$_2$P | 0.048 | 0.042 | [(C$_6$H$_5$)$_2$PBH$_2$]$_n$[CH$_3$PBH]$_m$. |
| XVI | p-CH$_3$C$_6$H$_4$(CH$_3$)HP | 0.847 | C$_3$H$_7$H$_2$P | 0.234 | 0.126 | [p-CH$_3$C$_6$H$_4$(CH$_3$)PBH$_2$]$_4$[C$_3$H$_7$PBH]. |
| XVII | p-C$_6$H$_5$C$_6$H$_4$(CH$_3$)HP | 0.590 | CH$_3$H$_2$P | 0.142 | 0.082 | [p-C$_6$H$_5$C$_6$H$_4$(CH$_3$)PBH$_2$]$_4$[CH$_3$PBH]. |
| XVIII | CH$_3$(n-C$_3$H$_7$)HP | 5.46 | C$_6$H$_{13}$H$_2$P | 2.32 | 1.108 | [CH$_3$(n-C$_3$H$_7$)PBH$_2$]$_4$[C$_6$H$_{13}$PBH]. |
| XIX | n-C$_4$H$_9$(CH$_3$)HP | 15.65 | C$_2$H$_5$H$_2$P | 6.22 | 3.51 | [n-C$_4$H$_9$(CH$_3$)PBH$_2$]$_n$[C$_2$H$_5$PBH]$_m$. |
| XXIII | n-C$_3$H$_7$(CH$_3$)HP | 0.3641 | CH$_3$H$_2$P | 0.0481 | 0.0711 | [n-C$_3$H$_7$(CH$_3$)PBH$_2$]$_2$[CH$_3$PBH]$_2$. |
| XXVI | (C$_6$H$_5$)$_2$HP | 0.482 | C$_6$H$_5$H$_2$P | 0.145 | 0.055 | [(C$_6$H$_5$)$_2$PBH$_2$]$_n$[C$_6$H$_5$PBH]$_m$. |

A variety of phosphine borine materials is used in the examples set forth above and it is to be understood that they may be prepared in accordance with the procedures set forth in our copending application, Serial No. 446,148, filed July 27, 1954, titled "Phosphine Borine Compounds and Their Preparation."

The phosphinoborine polymers of this invention are usually resistant to thermal decomposition and to oxidative and hydrolytic attack. The simplest of these polymers have thermal stabilities of the same order of magnitude as the phosphinoborine trimers and tetramers but with the added advantage of lower volatility because of the increased molecular weight. Since the copolymers of this invention display excellent dielectric properties, they find utility as dielectrics where high temperatures and opportunities for chemical reaction (such as hydrolysis) are prevalent.

Obviously, many other modifications and variations of this invention as hereinbefore set forth may be made without departing from the spirit and scope thereof and, accordingly, only those limitations should be imposed as are indicated in the appended claims. For example, the invention is not limited to polymers of individual phosphinoborines, but, as set forth in the examples, includes copolymers between different of the compounds, the method of preparation of such materials being that set forth above for individual phosphinoborines excepting that mixtures of precursors are prepared at the outset.

We claim:

1. The method of preparing phosphinoborine compounds which comprises: pyrolyzing together in a reaction zone at a temperature of between about 130° C. and about 320° C. a phosphine borine having the general formula RR'HP:BH$_3$ and a phosphine borine having the general formula R''H$_2$P:BH$_3$ wherein R, R' and R'' represent radicals selected from the group consisting of alkyl, phenyl, cycloalkyl, biphenyl, naphthyl and methyl-substituted phenyl.

2. The method of preparing phosphinoborine compounds which comprises: pyrolyzing together in a reaction zone at a temperature of between about 130° C. and about 320° C. a phosphine borine having the general formula RR'HP:BH$_3$ and a phosphine borine having the general formula R''H$_2$P:BH$_3$ wherein R and R'' are methyl and R' is ethyl.

3. The method of preparing phosphinoborine compounds which comprises: pyrolyzing together in a reaction zone at a temperature of between about 130° C. and about 320° C. a phosphine borine having the general formula RR'HP:BH$_3$ and a phosphine borine having the general formula R''H$_2$P:BH$_3$ wherein R is methyl, R' is ethyl and R'' is phenyl.

4. The method of preparing phosphinoborine compounds which comprises: pyrolyzing together in a reaction zone at a temperature of between about 130° C. and about 320° C. a phosphine borine having the general formula RR'HP:BH$_3$ and a phosphine borine having the general formula R''H$_2$P:BH$_3$ wherein R and R' are phenyl and R'' is methyl.

5. The method of preparing phosphinoborine compounds which comprises: pyrolyzing together in a reaction zone at a temperature of between about 130° C. and about 320° C. a phosphine borine having the general formula RR'HP:BH$_3$ and a phosphine borine having the general formula R''H$_2$P:BH$_3$ wherein R, R' and R'' are phenyl.

6. The method of preparing phosphinoborine compounds which comprises: pyrolyzing together in a reaction zone at a temperature of between about 130° C. and about 320° C. a phosphine borine having the general formula RR'HP:BH$_3$ and a phosphine borine having the general formula R''H$_2$P:BH$_3$ wherein R, R' and R'' are methyl.

7. A fused ring phosphinoborine compound having the formula:

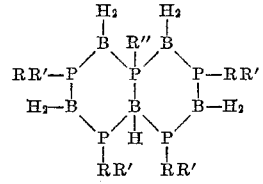

where R, R' and R'' are selected from the group consisting of alkyl, phenyl, cycloalkyl, biphenyl, naphthyl and lower alkyl-substituted phenyl.

8. A fused ring phosphinoborine compound having the formula:

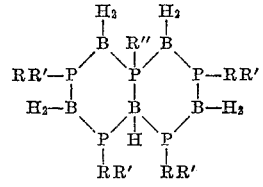

where R, R' and R'' are methyl.

9. A fused ring phosphinoborine compound having the formula:

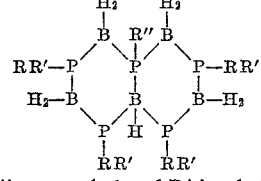

where R and R'' are methyl and R' is ethyl.

10. A fused ring phosphinoborine compound having the formula:

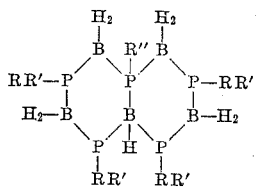

where R is methyl, R' is ethyl and R'' is phenyl.

11. A fused ring phosphinoborine compound having the formula:

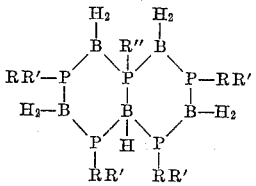

where R, R' are phenyl and R'' is methyl.

12. A fused ring phosphinoborine compound having the formula:

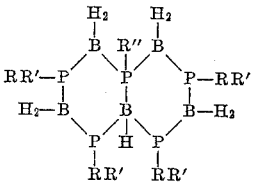

where R, R' and R'' are phenyl.

13. A phosphinoborine compound having the general formula:

$$[RR'PBH_2]_5[R''PBH]_2$$

where R, R' and R'' are selected from the group consisting of alkyl, phenyl, cycloalkyl, lower alkyl-substituted phenyl, biphenyl, and naphthyl.

14. A phosphinoborine compound having the general formula:

$$[RR'PBH_2]_n[R''PBH]_m$$

where R, R' and R'' are selected from the group consisting of alkyl, phenyl, cycloalkyl, biphenyl, naphthyl and methyl-substituted phenyl, where $n$ and $m$ are integers having a ratio of $n$ to $m$ in excess of 0 and no greater than 6:1 and wherein the unit $[RR'PBH_2]$ and $[R''PBH]$ are bonded to one another by bonds joining the P of one unit to the B of an adjacent unit to form a compound having a molecular skeleton consisting of alternate P and B atoms, said compound having a polycyclic ring configuration.

15. A phosphinoborine compound having the general formula:

$$[RR'PBH_2]_n[R''PBH]_m$$

where R, R' and R'' are selected from the group consisting of alkyl, phenyl, cycloalkyl, biphenyl, naphthyl and methyl-substituted phenyl, where $n$ and $m$ are integers having a ratio of $n$ to $m$ of 4:1 and wherein the units $RR'PBH_2$ and $R''PBH$ are bonded to one another by bonds joining the P of one unit to the B of an adjacent unit to form a compound having a molecular skeleton consisting of alternate P and B atoms, said compound being a fused ring compound.

16. A phosphinoborine compound consisting of units having the general formulae $[RR'PBH_2]$ and $[R''PBH]$, wherein R, R' and R'' are selected from the group consisting of alkyl, phenyl, cycloalkyl, biphenyl, naphthyl and lower alkyl-substituted phenyl, wherein individual units are linked by means of boron-to-phosphorus bonds to form a fused polycyclic ring system having a molecular skeleton consisting of alternate boron and phosphorus atoms, said system having at least two terminal rings, where the term "terminal ring" refers to a ring fused to but one other ring and a number $y$ of non-terminal rings, where the minimum value of $y$ is zero, the term "non-terminal ring" being defined as a ring fused to $x$ other rings where $x$ is an integer of between 2 and 3, each of the rings of the said system being formed of total of three of the aforesaid units, a single one of said $[R''PBH]$ units and two of the said $[RR'PBH_2]$ units being linked in alternate fashion in each terminal ring and $n$ of said $[RR'PBH_2]$ units being present in each non-terminal ring, wherein $n$ is a non-fractional value between 0 and 1 and $m$ of said $[R''PBH]$ units being present in each non-terminal ring, wherein $m$ is an integer of 2 to 3.

References Cited in the file of this patent

Burg et al.: Journal of the American Chem. Soc., vol. 75, Aug. 20, 1953, pages 3872–3877.